United States Patent [19]
Kalthoff et al.

[11] Patent Number: 6,105,484
[45] Date of Patent: Aug. 22, 2000

[54] LOCKOUT DEVICE FOR VALVE ACTUATORS

[76] Inventors: Gene Kalthoff, 15633 Parkwood Circle, Avon, Minn. 56310; Doug J Tanner, 37694 Riviera Rd., St. Cloud, Minn. 56303; Al W. Libke, 832 N. Oak St., Royalton, Minn. 56373

[21] Appl. No.: 09/178,121

[22] Filed: Oct. 23, 1998

[51] Int. Cl.[7] .................................................. F15B 15/26
[52] U.S. Cl. ..................................................... 92/17; 92/23
[58] Field of Search ................................ 92/23, 17, 13.8

[56] References Cited

U.S. PATENT DOCUMENTS

| | | | |
|---|---|---|---|
| 3,267,818 | 8/1966 | Chambers | 92/17 |
| 3,905,279 | 9/1975 | Yadon | 92/23 |
| 4,052,995 | 10/1977 | Ellison | 92/24 |
| 4,247,082 | 1/1981 | Sjolund | 92/23 |

*Primary Examiner*—F. Daniel Lopez
*Attorney, Agent, or Firm*—Ohlandt, Greeley, Ruggiero & Perle, L.L.P.

[57] ABSTRACT

A lockout device is used to prevent linear movement of a piston rod in a pneumatic cylinder actuator used for controlling the position of a valve flow control member or other applications. The lockout device includes a locking plate having a piston rod hole formed therein whereby the locking plate is threaded onto an end of the piston rod. Fastener holes are provided in the locking plate whereby the locking plate is fastened to the actuator housing to prevent movement thereof. A lockout cover assembly may be attached to the locking plate to prevent access by unauthorized personnel to fasteners placed in the fastener holes. A groove may be provided along the circumference of the locking plate whereby the lockout cover assembly is attached to the locking plate.

11 Claims, 4 Drawing Sheets

LOCKOUT DEVICE FOR VALVE ACTUATORS

FIELD OF THE INVENTION

This invention pertains generally to pneumatic cylinder actuators used for opening and closing valves, and more particularly to methods and devices for preventing the actuator from moving when air pressure is applied to the cylinder.

BACKGROUND OF THE INVENTION

Many valves have a rotatable flow control member positioned therein for controlling the flow of a fluid through the valve. The valve flow control member is rotated between open and closed positions to control the flow of fluid through the valve. In many cases, particularly for large valves used in industrial applications, the valve flow control member is rotated by a pneumatic cylinder actuator which is coupled to the valve shaft, which, in turn, is coupled to the valve flow control member. The pneumatic actuator typically includes a cylinder, a piston mounted in the cylinder, a piston rod attached to the piston and extending from the cylinder, and a structure for coupling the piston rod to the valve shaft to convert linear motion of the piston rod to rotational motion of the valve shaft. The valve flow control member is rotated by admitting and removing pressurized air from the cylinder, which moves the piston and the piston rod, to thereby rotate the valve shaft and flow control member.

In some cases, such as when maintenance of the valve is required, it is desirable to lock the valve flow control member in a desired position. This may be accomplished by preventing the pneumatic actuator from moving when air pressure is applied to the cylinder. A lockout device for the actuator must be able to withstand the fall force of the actuator without moving the valve.

SUMMARY OF THE INVENTION

The present invention provides a simple, inexpensive, and very rugged and reliable device for preventing a pneumatic cylinder actuator from moving the flow control member of a valve when air pressure is applied to the cylinder. A lockout device in accordance with the present invention includes a disk with a tapped hole in the center and fastener holes positioned around the tapped center hole. The tapped center hole is adapted to be threaded onto the end of a piston rod of a pneumatic cylinder valve actuator. The fastener holes are adapted to be aligned with corresponding fastener holes formed in the actuator housing. The lockout device is threaded onto the end of the piston rod until the device is positioned adjacent to the actuator housing. The lockout device is then secured to the actuator housing using fasteners, such as bolts, which extend through the fastener holes in the lockout device into the fastener holes formed in the actuator housing. The fasteners prevent rotation of the lockout device. The lockout device prevents linear movement of the piston rod. Thus, a lockout device in accordance with the present invention may be used to lock the pneumatic cylinder actuator in one of an almost infinite number of positions.

A lockout device in accordance with the present Invention preferably includes a lockout cover assembly. The lockout cover assembly may be attached to, and locked on, the lockout device, to prevent access to the lockout device, and particularly to the fasteners used to fix the device in position on the actuator housing, by unauthorized personnel. A lockout device in accordance with the present invention may have a groove formed around the outer diameter tbereof which is adapted to receive a lockout cover assembly. The lockout cover assembly may be formed of two half shells coupled together in a hinged relation. The two half shells may be closed about the hinge to form a shell which engages the groove formed in the lockout device and which entirely covers the side of the lockout device wherein the fasteners are placed to secure the lockout device to the actuator housing. Each half shell of the lockout cover assembly may have a tab formed extending therefrom. Each such tab has a hole formed therein, such that the holes in each tab are aligned with each other when the lockout cover assembly is attached to the lockout device. A lock, such as a padlock, may be positioned in the aligned holes, to prevent removal of the lockout cover assembly from the lockout device by unauthorized personnel.

Further objects, features, and advantages of the present invention will be apparent from the following detailed description taken in conjunction with the accompanying drawings.

DETAILED DESCRIPTION OF THE INVENTION

Figure 1:
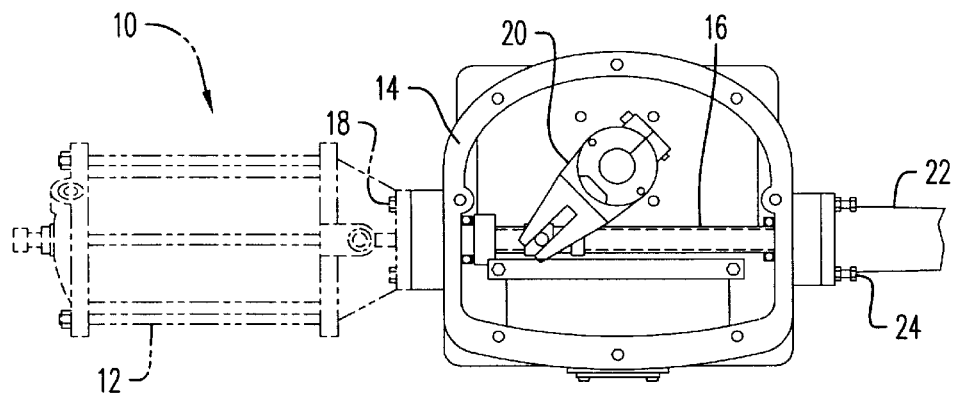
FIG. 1 is a top view of a pneumatic cylinder valve actuator as known in the art.
Figure 2:
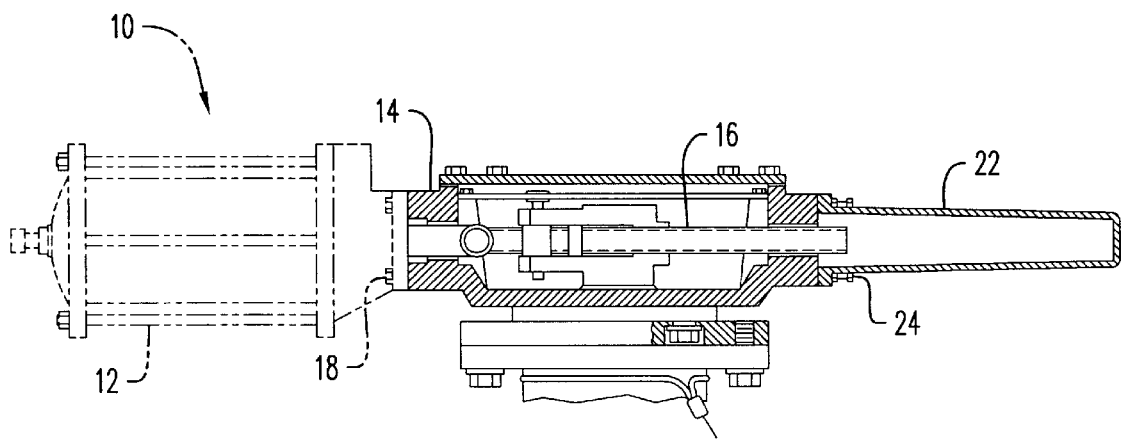
FIG. 2 is a side view, in partial cross section, of the pneumatic cylinder valve actuator of FIG. 1.

An exemplary pneumatic cylinder actuator 10 with which a lockout device in accordance with the present invention may be employed is illustrated in FIGS. 1 and 2. The exemplary cylinder actuator 10 is employed for rotating the flow control member of a valve (not shown). It should be understood that a lockout device in accordance with the present invention may be used in combination with other cylinder actuator designs than those described therein, and, in particular, may be used in combination with cylinder actuators which are not employed for controlling the flow control member of a valve.

The main components of the pneumatic cylinder actuator 10 include an actuator cylinder 12, attached to an actuator housing 14, and a piston rod 16, extending from the cylinder 12 into and through the housing 14. The cylinder 12 is attached to the housing 14 in a conventional manner, such as by bolts 18 or other fasteners. The cylinder 12 is operated in a conventional manner to move the piston back and forth in a linear direction. For example, the piston rod may be coupled to a piston (not shown) mounted in the cylinder. Pressurized air admitted into and removed from the cylinder causes the piston, and, therefore the piston rod to move linearly. A conventional cam or yoke mechanism 20 may be coupled to the piston rod 16 to convert linear motion of the piston rod 16 into rotational motion for, e.g., rotating the flow control member of a rotary control valve. The piston rod 16 is threaded along its length, and extends from a side of the housing 14 opposite the cylinder 12. A cover 22 is typically attached to the housing 14 to cover the end of the piston rod 16 extending therefrom. The cover 22 is attached to the housing by bolts 24 or other fasteners which are mounted in fastener holes formed in the housing 14.

Figure 3:
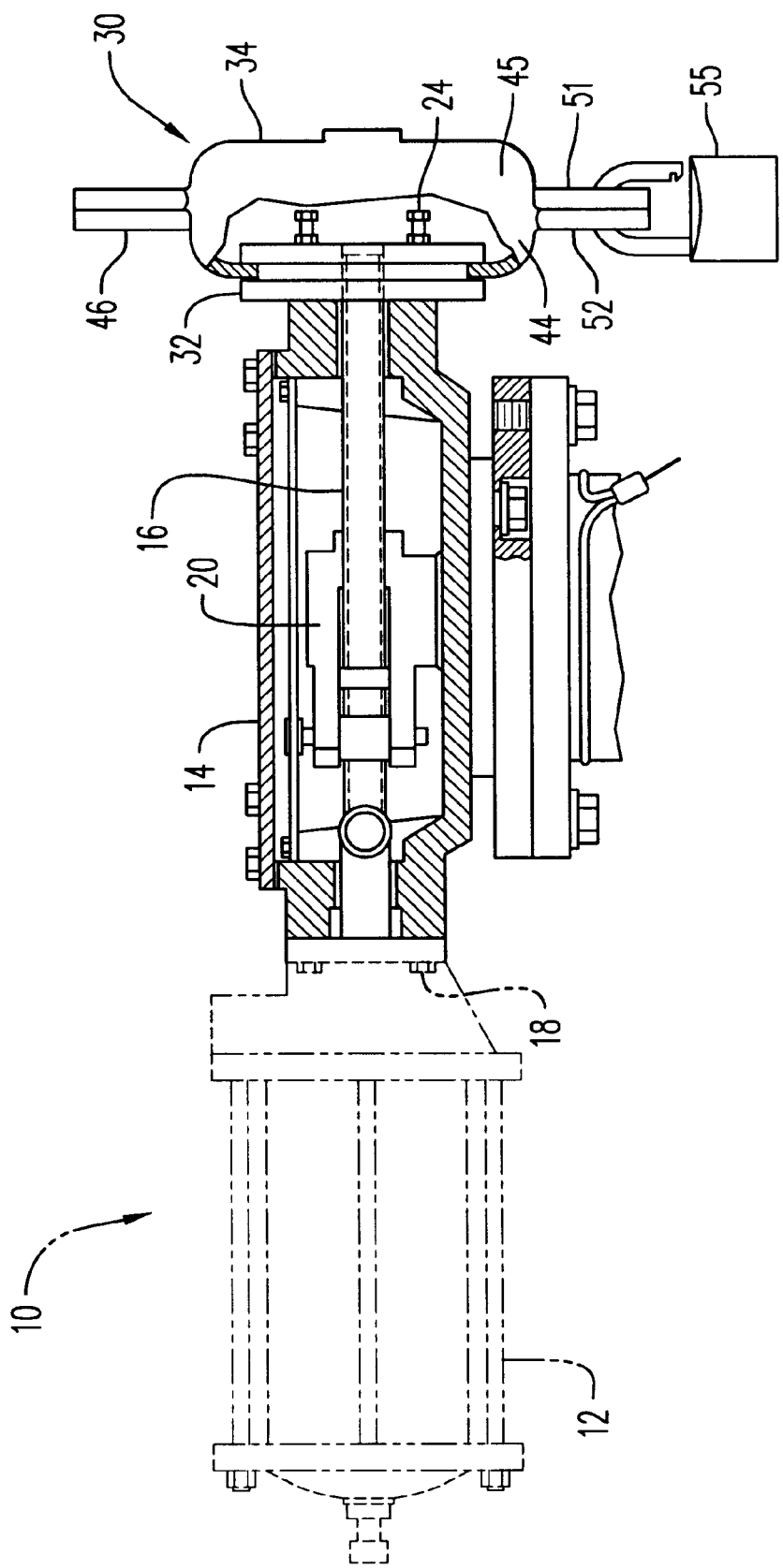
FIG. 3 is a side view, in partial cross section, of the pneumatic cylinder valve actuator of FIGS. 1 and 2 with a lockout device in accordance with the present invention attached thereto.

In accordance with the present invention, linear motion of the piston rod 16 is prevented by a lockout device attached thereto. An exemplary lockout device 30 in accordance with the present invention is shown in FIG. 3, as attached to the pneumatic cylinder actuator 10. The lockout device 30 includes a locking plate 32, which is attached to both the piston rod 16 and the actuator housing, and a lockout cover assembly 34, which is attached to the lockout plate 32 to prevent tampering with the lockout plate by unauthorized personnel.

Figure 4:
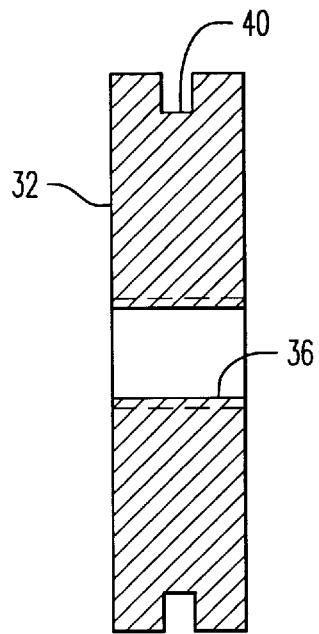
FIG. 4 is a side view, in cross section, of an exemplary lockout device in accordance with the present invention.
Figure 5:
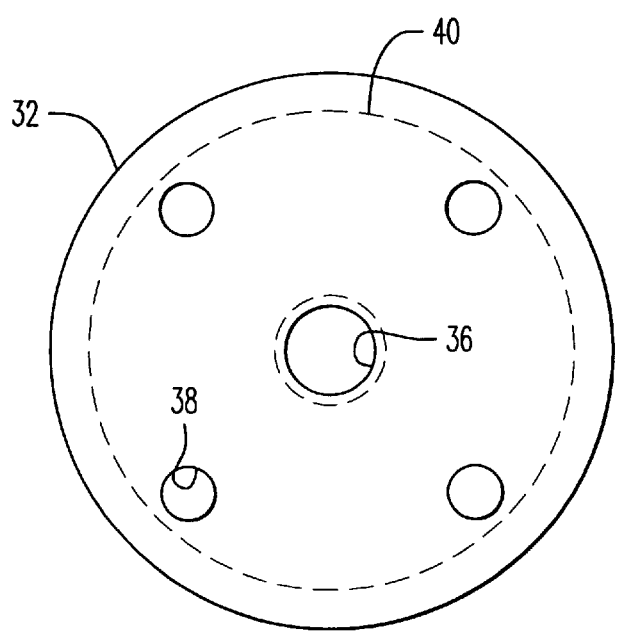
FIG. 5 is a front view of the exemplary lockout device of FIG. 4.

A preferred locking plate 32 in accordance with the present invention is illustrated in, and will be described in detail with reference to, FIGS. 4 and 5. The locking plate 32 is preferably formed as a steel disc. It should be understood that the locking plate 32 may be made of other materials and need not be disc shaped, however. A piston rod hole 36 is formed in and through the locking plate 32. The piston rod hole 36 may preferably be positioned at the axial center of the locking plate 32. The piston rod hole 36 is adapted for attaching the locking plate 32 to the piston rod 16 such that the piston rod 16 is prevented from moving linearly with respect to the locking plate 32. Thus, the piston rod hole 36 preferably includes threads sized for threading the locking plate 32 onto the piston rod 16. At least one fastener hole 38 is formed in and through the locking plate 30 along with the piston rod hole 36. Preferably more than one fastener hole is formed in the locking plate 30 around the piston rod hole 36, between the piston rod hole 36 and the outer edge of the locking plate 32. The fastener holes 38 are positioned on the locking plate 32 such that when the locking plate is threaded onto the piston rod 16 into a position adjacent to the actuator housing 14, at least one of the fastener holes may be aligned with a corresponding fastener hole formed in the housing. A groove 40 preferably may be formed around the outer circumference of the locking plate 32. As will be described in more detail below, the groove 40 is employed for attaching the lockout cover assembly 34 to the locking plate 32.

Figure 7:
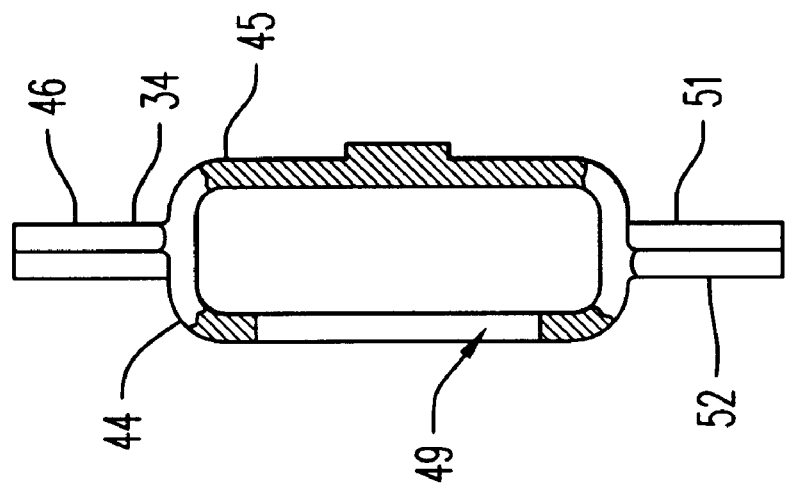
FIG. 7 is a side view, in partial cross section, of the exemplary lockout cover assembly of FIG. 6.
Figure 6:
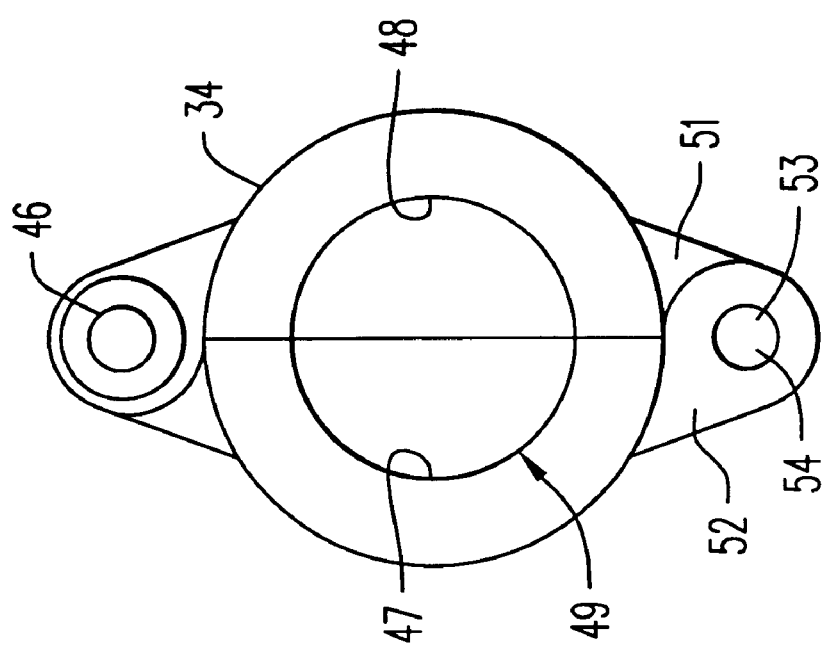
FIG. 6 is a front view of an exemplary lockout cover assembly in accordance with the present invention.

The lockout cover assembly 34 may preferably form a shell for covering one side of the locking plate 32, to prevent access to the fastener holes 36 and any fasteners placed therein by unauthorized personnel. An exemplary lockout cover assembly in accordance with the present invention is illustrated in, and will be described in detail with reference to, FIGS. 6 and 7. The lockout cover assembly may be formed as two half shells 44 and 45, which are connected together by a hinge 46. Each half shell has a semicircular opening 47 or 48 formed therein. When the two half shells 44 and 45 are closed together, by rotating the half shells 44 and 45 about the hinge 46, a lockout cover assembly shell is formed having a circular opening 49 therein defined by the semicircular openings 47 and 48 formed in each half shell. The radius of the circular opening 49 formed in the lockout cover assembly shell is selected to be slightly larger than the radius of the groove 40 formed in the locking plate 32. Thus, the lockout cover assembly 34 may be attached to the locking plate 32 by closing the two half shells 44 and 45 together over the circumference of the locking plate 32 such that the edges of the semicircular openings 47 and 48 formed in each half shell 44 and 45 are positioned in the groove 40 formed in the locking plate 32. Each half shell 44 and 45 preferably also includes a tab 51 or 52 extending therefrom. Each tab 51 and 52 has a lock hole 53 or 54 formed therein and positioned such that when the two half shells 44 and 45 are closed together over the locking plate 32 the holes 53 and 54 in the tabs 51 and 52 are aligned. A standard lock, such as a combination or key operated pad lock 55, may be placed in the holes 53 and 54 in the tabs 51 and 52 to prevent the half shells 44 and 45 from being separated. Thus, the lock 55 prevents opening of the lockout cover assembly to prevent access to fasteners placed in the fastener holes 38 formed in the locking plate 32.

A lockout device in accordance with the present invention may be used to lock the piston rod of a pneumatic cylinder actuator in position in the following manner. The piston rod 16 is moved to a desired position by operation of the actuator cylinder 12 in a conventional manner. The piston rod cover 22 is removed from the actuator housing 14 by removing the bolts 24 therefrom. The locking plate 32 is threaded onto the end of the piston rod 16 until the locking plate is adjacent to the actuator housing 16. The locking plate 32 is then backed off from the actuator housing 14, if necessary, until the fastener holes 38 in the locking plate are aligned with corresponding fastener holes in the housing 14. The bolts 24 may then be placed through the fastener holes 38 in the locking plate 32 into the corresponding fastener holes in the housing 14. The locking plate 32 is thus secured to the piston rod 16 and the actuator housing 14 in such a manner as to prevent linear movement of the piston rod 16 when air pressure is provided to the cylinder 12. To prevent tampering with the bolts 24, the lockout cover assembly 34 may be attached to the locking plate, 32 and locked using lock 55 in the manner described previously.

It is understood that the present invention is not limited to the particular applications and embodiments described and illustrated herein, but covers all such variations thereof as come within the scope of the following claims.

What is claimed is:

1. A lockout device for a pneumatic cylinder actuator having a piston rod connected to a pneumatically activated cylinder and an actuator housing, comprising:

a lockout plate having a piston rod hole formed therein which is adapted to be threaded onto the actuator piston rod and at least one fastener hole formed therein which is positioned thereon to receive a fastener for attaching the lockout plate to the actuator housing, in a manner that prevents said lockout plate from rotating relative to said actuator housing.

2. A lockout device as defined in claim 1, wherein the lockout plate is disk shaped, wherein the piston rod hole is formed in the axial center of the lockout plate disk, and wherein the at least one fastener hole is positioned on a face of the lockout plate disk between the piston rod hole and an outer edge of the disk.

3. A lockout device as defined in claim 1, comprising additionally a groove formed in an outer diameter of the lockout device.

4. A lockout device for a pneumatic cylinder actuator having a piston rod connected to a pneumatically activated cylinder and an actuator housing comprising:

(a) a lockout plate having a piston rod hole formed therein which is adapted to be threaded onto the actuator piston rod and at least one fastener hole formed therein which is positioned thereon to receive a fastener for attaching the lockout device to the actuator housing, and (b) a lockout cover assembly attached to the lockout plate to cover the fastener holes to prevent access thereto.

5. A lockout device as defined in claim 4, wherein the lockout plate is disk shaped, wherein the piston rod hole is formed in the axial center of the lockout plate disk, and wherein the at least one fastener hole is positioned on a face of the lockout plate disk between the piston rod hole and an outer edge of the disk.

6. A lockout device as defined in claim 4, comprising additionally a groove formed in an outer diameter of the lockout device and wherein the lockout cover assembly is mounted in the groove.

7. A lockout as defined in claim 6, wherein the lockout cover assembly includes two half shells connected together in a hinged relation.

8. A lockout device as defined in claim 7, wherein the lockout device includes a tab formed on each half shell and a hole formed through each tab and positioned thereon such that the holes are aligned to receive a lock therethrough when the lockout cover assembly is attached to the lockout plate.

9. A method for locking a piston rod for a pneumatic cylinder actuator in position, comprising the steps of:

(a) mounting a lockout plate having a piston rod hole and at least one fastener hole formed therein onto the actuator piston rod by threading the lockout plate piston rod hole onto the piston rod until the lockout plate is adjacent to a housing of the actuator;

(b) aligning the at least one fastener hole with a fastener hole formed in the actuator housing; and (c) placing a fastener through the fastener hole in the lockout plate and into the actuator housing to thereby hold the lockout plate in position.

10. A method as defined in claim 9, comprising the additional step of attaching a lockout cover assembly to the lockout plate to cover the fasteners positioned in the fastener holes to prevent access thereto.

11. A method as defined in claim 10, wherein the step of attaching a lockout cover assembly to the lockout plate includes the step of mounting the lockout cover assembly in a groove formed in an outer circumference of the lockout plate.

* * * * *